Patented May 7, 1940

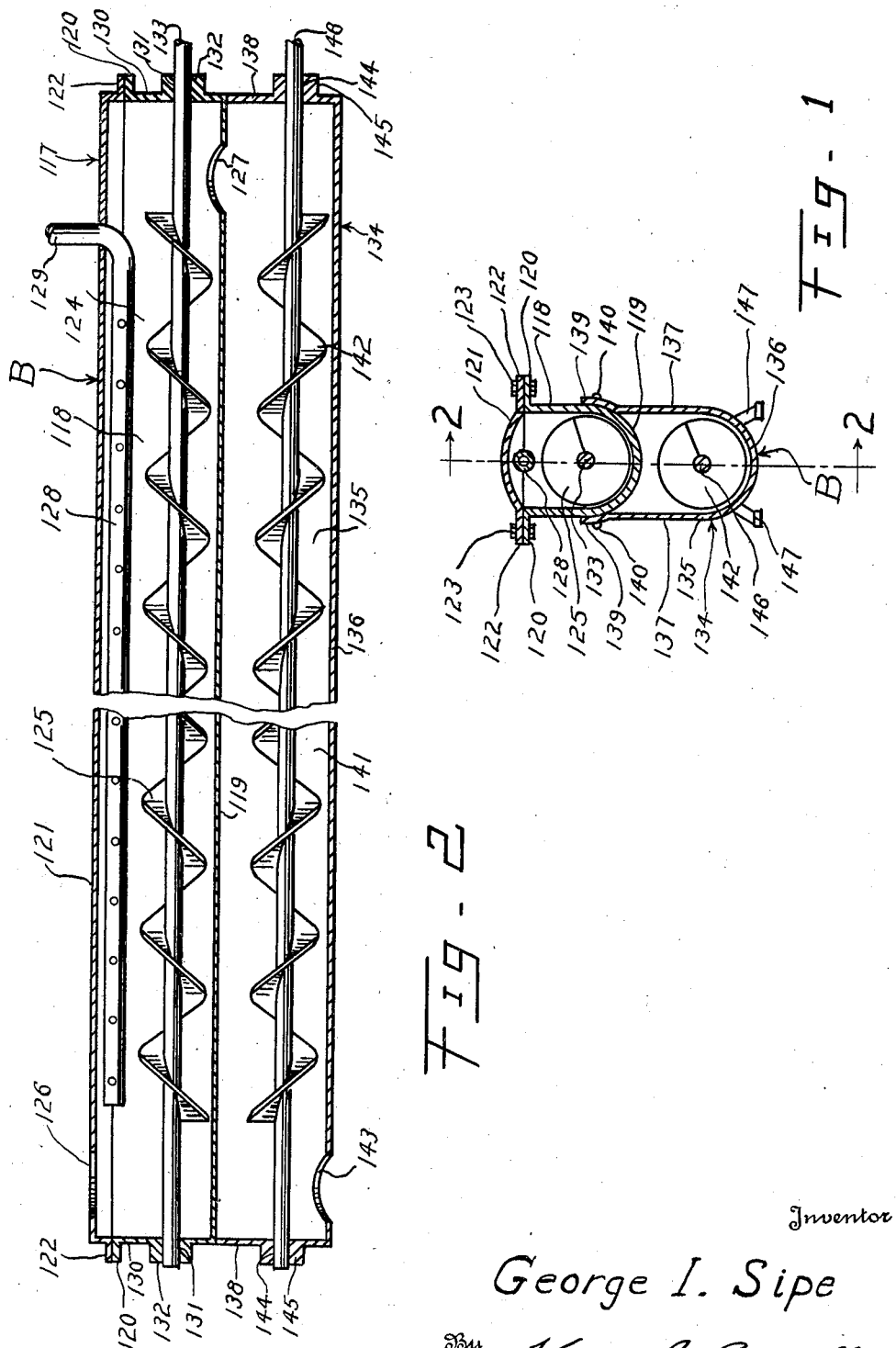

2,200,192

UNITED STATES PATENT OFFICE 2,200,192

STEAMER

George I. Sipe, Lancaster, Pa.

Application January 26, 1938, Serial No. 187,072

6 Claims. (Cl. 53—18)

The invention relates to a steamer for use in connection with an apparatus for producing bread-crumbs, more particularly sterile, non-deteriorating type bread-crumbs, but it is to be understood that the steamer is for use in any connection for which it may be found applicable.

The invention aims to provide, in a manner as hereinafter set forth, a steamer for steaming shredded material while the latter is being conveyed.

The invention further aims to provide, in a manner as hereinafter set forth, a steamer including superposed communicating compartments for conveying therethrough shredded material and simultaneously with the conveying of material through the upper compartment subjecting it to a steaming action by the supplying of steam into the said upper compartment.

The invention further aims to provide, in a manner hereinafter set forth, a steamer including a pair of superposed compartments, means for conveying shredded material in opposite directions through said compartments and a steam supply pipe opening into the upper compartment for steaming the shredded material as it is conveyed through said upper compartment.

The invention further aims to provide, in a manner as hereinafter set forth, a steamer for the purpose referred to, which is comparatively simple in construction and arrangement, strong, durable, compact, thoroughly efficient in its use, readily assembled and comparatively inexpensive to manufacture.

Embodying the aims aforesaid and others which may hereinafter appear, the invention consists of the novel construction, combination and arrangement of parts as will be more fully described and illustrated in the accompanying drawing, wherein is shown an embodiment of the invention, but it is to be understood that changes, variations and modifications may be resorted to which fall within the claims hereunto appended.

In the drawing:

Figure 1 is a vertical sectional view of a steamer in accordance with this invention; and Figure 2 is a longitudinal sectional view, broken away, taken on line 2—2 of Figure 1.

The steamer includes an upper housing 117 formed of an open top body part 118, of substantially U-form in vertical section having a rounded bottom 119 and oppositely disposed outwardly extending side and end flanges 120 at its top. A closure 121 is provided for the open top of body part 118. The closure 121 is of arcuate contour in transverse section and formed with oppositely disposed outwardly extending side and end flanges 122 which seat on the flanges 120. The flanges 120 are secured to the flanges 122 by the holdfast devices 123. The housing 117 provides the steamer with an upper chamber 124 constituting a steaming chamber for the material. Within the upper chamber 124 is arranged an upper conveyor 125. The closure 121 at one end is formed with an opening 126 into which extends a chute, not shown, for supplying the material to be steamed to one end of the chamber 124. The bottom 119 at one end is formed with an opening 127 for a purpose to be referred to. Extending lengthwise of chamber 124 and above the conveyor 125 is a perforated steam supply pipe 128 for steaming the material passing through the chamber 124. One end of pipe 128 is formed with an angularly disposed extension 129 which passes through the closure 121 and leads to a source of steam supply not shown. The side walls of body part 118, indicated at 130 are formed with aligned openings 31 and annular bosses 132 on their outer faces registering with the openings 131. The shaft 133 of the conveyor 125 is mounted in the openings 131 and bosses 132 and extends from one of the walls 130.

The steamer includes a lower housing 134 formed of an open top body part 135 of substantially U-form in vertical section having a rounded bottom 136, front and rear walls 137 and side walls 138. The walls 137, 138 are flared outwardly at their upper portions, as at 139. The housing 117 seats on and is anchored to the flared portions of housing 134 by the holdfast means 140 for the purpose of closing the top of housing 134. The housing 117 in connection with the housing 134 forms a closed top lower chamber 141 for a lower spiral conveyor 142. The opening 127 functions as an outlet for the steamed material from the chamber 124 and the intake of chamber 141 for the steamed material. The bottom 136 of part 135, of housing 134 at one end thereof is formed with an opening 143 which constitutes an outlet for the steamed material from the chamber 141. The walls 138 of body part 135 are formed with aligned openings 144 and annular bosses 145 on their outer faces registering with the openings 144. The shaft 146 of the conveyor 142 is mounted in the openings 144 and bosses 145 and extends from one of the walls 138 and aligns with the extended portion of shaft 133. The opening 126 of the steamer is located at that end thereof opposite the end in which the opening 127 is located and aligns with the opening 143. The conveyors 125, 142 revolve in opposite directions. The direction of revolution of conveyor 125 is such as to cause it to convey the material in chamber 124 in a direction from opening 126 to opening 127. The direction of revolution of conveyor 142 is such as to cause it to convey the material in a direction from opening 127 to opening 143 for the purpose of discharging the material acted upon from the chamber 141. The steamer is to be mounted on suitable supports. The shafts 133, 146 are operated in unison in opposite directions by any suitable means.

What I claim is:

1. In an apparatus for the purpose set forth, a material steamer formed with upper and lower closed communicating chambers substantially of U-form, a material intake for said upper chamber, a material outlet for said lower chamber, means for conveying material in opposite directions through said chambers, and means for supplying steam to and lengthwise of the upper chamber above the conveying means in said upper chamber.

2. In an apparatus for the purpose set forth, a material steamer formed with upper and lower superimposed communicating chambers, a material intake for said upper chamber, a material outlet for said lower chamber, said intake and outlet being arranged respectively in the top and bottom of said upper and lower chambers, means arranged in each of said chambers for conveying material in opposite directions through said chambers, and means within the upper chamber above the conveying means in said upper chamber for supplying steam to and lengthwise of the upper chamber, said intake and outlet being arranged in vertical alignment and in proximity to an end of said chambers.

3. In an apparatus for the purpose set forth, a material steamer comprising a pair of superimposed trough-shaped sections forming upper and lower chambers for the passage of material being steamed, the bottom of the upper section forming the bottom of the upper chamber and top of the lower chamber, the bottom of the lower section being formed with an outlet for the lower chamber, the bottom of the upper section being formed with an opening for establishing communication between said chambers, said opening constituting an outlet for the upper chamber and an intake for the lower chamber, a closure for the upper chamber secured to the upper section and being formed with an intake for the upper chamber, means for supplying steam lengthwise of the upper chamber, and means for conveying the material in opposite directions through said chambers.

4. In an apparatus for the purpose set forth, a material steamer comprising a pair of superimposed trough-shaped sections forming upper and lower chambers for the passage of material being steamed, the bottom of the upper section forming the bottom of the upper chamber and top of the lower chamber, the bottom of the lower section being formed with an outlet for the lower chamber, the bottom of the upper section being formed with an opening for establishing communication between said chambers, said opening constituting an outlet for the upper chamber and an intake for the lower chamber, a closure for the upper chamber secured to the upper section and being formed with an intake for the upper chamber, means for supplying steam lengthwise of the upper chamber, and a pair of oppositely revoluble material conveyors, each arranged in a chamber and journaled in the ends of a section.

5. In an apparatus for the purpose set forth, a material steamer formed with upper and lower horizontally disposed superposed communicating chambers, a material intake for said upper chamber, a material outlet for said lower chamber, means in each of said chambers for conveying material in opposite directions through said chambers, and a tubular perforated element disposed lengthwise of the upper chamber and located above the conveying means in the upper chamber for supplying steam to the upper chamber.

6. In an apparatus for the purpose set forth, a material steamer comprising a pair of superimposed trough-shaped sections forming upper and lower chambers for the passage of material being steamed, the bottom of the upper section forming the bottom of the upper chamber and top of the lower chamber, the bottom of the lower section being formed with an outlet for the lower chamber, the bottom of the upper section being formed with an opening for establishing communication between said chambers, said opening constituting an outlet for the upper chamber and an intake for the lower chamber, a closure for the upper chamber secured to the upper section and being formed with an intake for the upper chamber, means for supplying steam lengthwise of the upper chamber, means for conveying the material in opposite directions through said chambers, said sections having rounded bottoms and with the bottom of the upper section depending within the upper portion of the lower section.

GEORGE I. SIPE.